(12) United States Patent
Nath et al.

(10) Patent No.: US 12,346,245 B2
(45) Date of Patent: *Jul. 1, 2025

(54) GENERATING FAULT CONDITIONS USING A FAULT-ENABLED SOFTWARE DEVELOPMENT KIT

(71) Applicant: Microsoft Technology Licensing, LLC, Redmond, WA (US)

(72) Inventors: Suman K. Nath, Redmond, WA (US); Peter C. Shrosbree, Redmond, WA (US); Fazle Elahi Faisal, Bothell, WA (US); Tanakorn Leesatapornwongsa, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,778

(22) Filed: Jan. 31, 2024

(65) Prior Publication Data
US 2024/0168871 A1    May 23, 2024

Related U.S. Application Data

(63) Continuation of application No. 17/342,094, filed on Jun. 8, 2021, now Pat. No. 11,921,622.

(51) Int. Cl.
*G06F 9/44* (2018.01)
*G06F 11/30* (2006.01)
*G06F 11/3668* (2025.01)

(52) U.S. Cl.
CPC ...... *G06F 11/3688* (2013.01); *G06F 11/3075* (2013.01); *G06F 11/3692* (2013.01); *G06F 11/3696* (2013.01)

(58) Field of Classification Search
None
See application file for complete search history.

(56) References Cited

U.S. PATENT DOCUMENTS

| | | | |
|---|---|---|---|
| 8,756,459 B2* | 6/2014 | Raz-Pelleg | G06F 11/008 714/21 |
| 11,048,620 B2* | 6/2021 | Archer | G06F 11/3692 |
| 11,144,440 B1* | 10/2021 | Daniali | G06F 11/3688 |
| 11,294,642 B2* | 4/2022 | Champagne | G06F 11/3624 |
| 2019/0205233 A1* | 7/2019 | Jung | G06F 11/263 |
| 2022/0214964 A1* | 7/2022 | Connolly, Jr. | G06F 11/3692 |

* cited by examiner

*Primary Examiner* — Qamrun Nahar

(57) ABSTRACT

Systems and methods are provided for automatically generating a fault-enabled software development kit (SDK) to test an application. The generating includes determining one or more faults based on codes associated with the SDK and a frequency of occurrences of faults while executing the SDK. A fault injector automatically injects the determined faults in select layers of code in the SDK and generates fault configuration data associated with the automatically injected faults in the SDK. The fault configuration data describes faults that have been injected in the fault-enabled SDK to test an application. The fault-enabled SDK tests the application without needs for modifying the application code for testing purposes. The fault-enabled SDK further provides types of faults that may be common in using the SDK without requiring application developers to have detailed understanding of internals of the SDK to test the application with simulated faults.

20 Claims, 9 Drawing Sheets

FIG. 3A

Fault Configuration Data 302

| Command Name 304 | Layer 306 | Fault Mode 308 | Fault Description 310 |
|---|---|---|---|
| Read Object | Network | OFF | |
| Get Object | Transport | ON | HTTP 401 (Authentication Error) |
| ... | | | |

FIG. 3B

Fault Log 342

| Timestamp 344 | Command 346 | Fault Status 348 | Target Server 350 |
|---|---|---|---|
| 20210510100810 | Get | 401 | Cloud_Storage-001 |
| 20210510100825 | Get | 401 | Cloud_Storage-001 |
| 20210510101001 | Get | 401 | Cloud_Storage-001 |
| 20210510101330 | Get | 401 | Cloud_Storage-001 |
| 20210510101411 | Copy | 401 | Cloud_Storage-001 |
| 20210510101421 | Get | 401 | Cloud_Storage-001 |
| 20210510101430 | Get | 401 | Cloud_Storage-001 |
| ... | | | |

GENERATING FAULT CONDITIONS USING A FAULT-ENABLED SOFTWARE DEVELOPMENT KIT

CROSS-REFERENCE TO RELATED APPLICATIONS

This application is a continuation of U.S. patent application Ser. No. 17/342,094, filed on Jun. 8, 2021, the disclosure of which is hereby incorporated by reference in its entirety.

BACKGROUND

As use of cloud services become popular, interactions among application programs using layers of software transmitting data across networks become commonplace. Resilience of an application therefore becomes an issue, especially since many factors may cause various types of faults that can affect execution of an application. For example, a network disconnect may occur at any time; authentication errors may occur; a sudden spike in workload by a central processing unit (CPU); and, in some cases software in the layers outside the application may error by time-outs after waiting for allocation of resources. Many of the faults occur not necessarily because of executing the application but because of a failure in another program application or some hardware in a system infrastructure.

Testing the application for its resilience against a variety of types of faults has become important. The testing is very complex. The application needs to sustain from occurrences of faults that occur in various places in the system and on the network. Testing faults often includes creating or simulating faults that the application encounters while executing. Some developers inject faults in the application program code when the developers are knowledgeable about behavior of the faults. As systems become more complex, in use of cloud services for example, complete understanding of faults over the network and/or in cloud servers by application developers becomes difficult. In practice, application developers may be unaware of internals of all the layers of libraries in a computer, underlying infrastructure across the network, and inside the cloud. The application developers need to minimize their need to develop separate application programs for testing and for production use. Furthermore, testing application programs by generating or simulating faults that affect the only the application without affecting other software in the system has become difficult because of the use of shared resources in the system. Accordingly, application developers need ways to simulate faults to test the application program code. Thus, developing a technology that better meets these needs while minimizing trade-offs would be desirable.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, incorporating a set of predetermined types of faults within a software development kit (SDK), which enables applications to access a remote service, resolves the above and other issues. The present disclosure relates to generating a fault-enabled SDK for testing an application. In particular, a fault-enabled SDK generator automatically generates a fault-enabled SDK based on a received SDK. The fault-enabled SDK generator determines faults based on public methods or application programming interface (API) of the received SDK and automatically injecting faults into the received SDK code. The fault-enabled SDK generator creates fault configuration data, which lists a variety of faults that the fault-enabled SDK can simulate. Developers and testers of client applications configure types of faults the fault-enabled SDK generates.

The fault-enabled SDK generator further receives a log of errors and/or faults that have occurred in the received SDK. By ranking the faults based on a frequency of occurrence and severity of the faults to the application, the fault-enabled SDK generator determines which faults to inject for generating a fault-enabled SDK.

The fault-enabled SDK simulates faulty conditions for application programs and helps testing the application programs by enabling the developers and testers of the application programs to specify which faults to generate.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 3A illustrates an example of a fault configuration data in accordance with aspects of the present disclosure.

FIG. 3B illustrates an overview of an example of a fault log in accordance with aspects of the present disclosure

DETAILED DESCRIPTION

Figure 1:
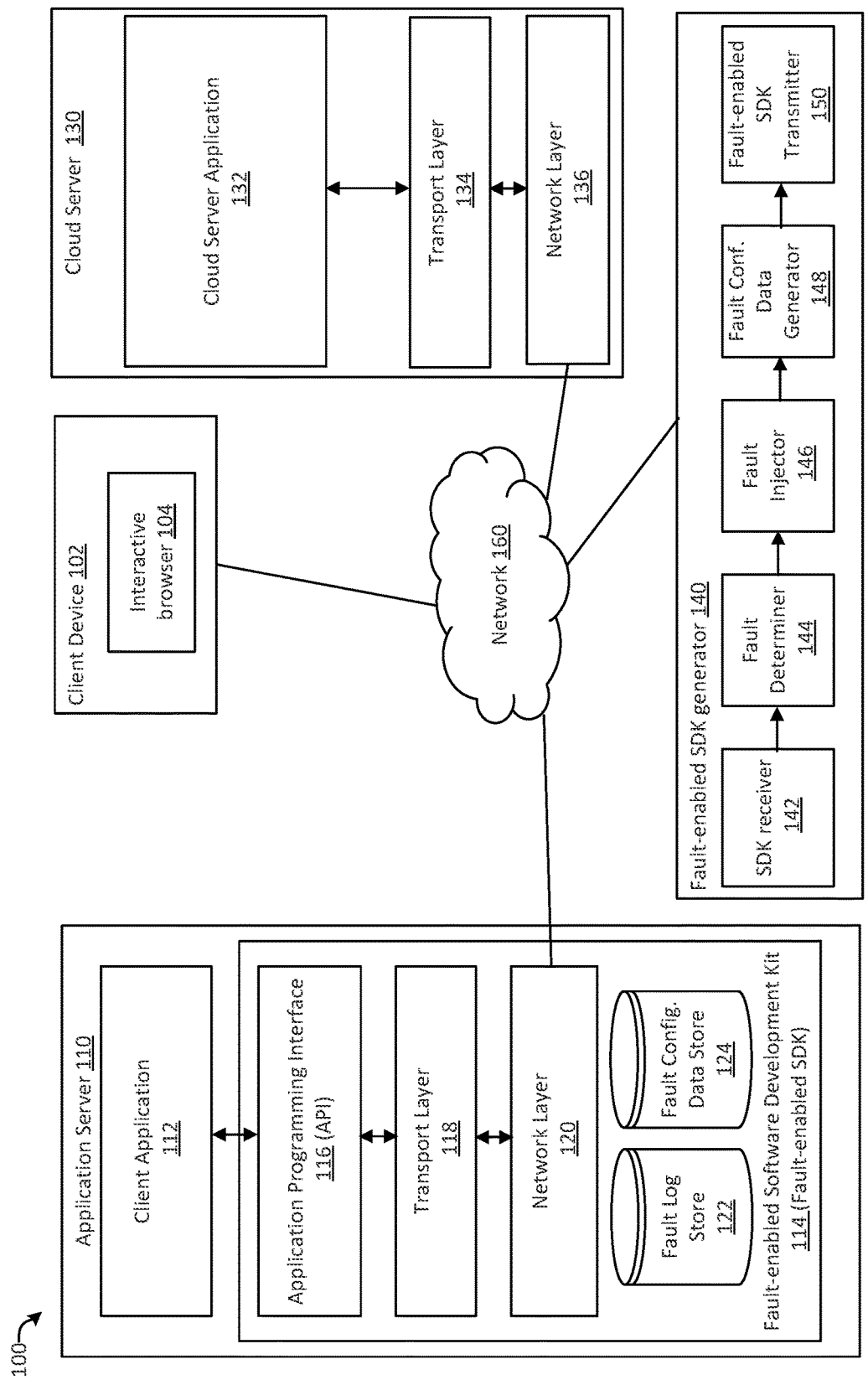
FIG. 1 illustrates an overview of an example system for generating a failure in an SDK for testing an application in accordance to aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects.

As applications interact with services across the network (e.g., cloud services), maintaining resilience of an application has become an issue because testing becomes complex. Many faults (or failures) may occur outside the control of the application. Application developers often do not know with accuracy all the types of faults that the application needs to expect and to process in a graceful and effectual manner.

To test the application, application developers typically had two traditional approaches. First is to inject fault conditions within the application program code to simulate the faults in underlying systems and validate handling of the faults. For example, an application developer code a dummy function or object to that returns an error in response to the calling of the function or the object by other parts of the application. This application-level approach was often convenient for the application developers because the application developers had a control over the program code in the application. On the other hand, modifying and injecting code that is not necessarily for production use in the application is prone to more quality issues in the application.

Second is to generate faults in underlying system by physically causing a failure. For example, the application developers may disconnect a network cable from a computer that executes the application to cause a network disconnect failure. The approach of generating a fault in the underlying infrastructure becomes an issue when the tester needs to generate the fault in a controlled manner where the fault affects the application but without affecting other programs that are concurrently running in the system. For example, disconnecting the network (i.e., unplugging a network cable) may cause a fault that is catastrophic to the client application server. Furthermore, disconnecting the network may cause an issue to become too complex to isolate the application that is being tested.

As discussed in more detail below, the present disclosure relates to an SDK that generates a failure for testing an application. In particular, the SDK generates a failure of a command execution as requested by the application through an application programming interface (API) according to a failure configuration data. In aspects, the SDK includes a transport layer, which communicates with a server through a network, and mimics a failure by returning an error status and code to the application.

FIG. 1 illustrates an overview of an example system 100 for generating a failure using an SDK for testing an application in accordance with aspects of the present disclosure. System 100 represents a system for testing an application using an SDK that generates a failure. System 100 includes a client device 102, an application server 110, a cloud server 130, a fault-enabled SDK generator 140, and a network 160. The client device 102 communicates with the application server 110. The application server 110 includes a client application 112 and a software development kit 114 (SDK). The client application 112 executes as an application on the client device 102. In aspects, the client device 102 includes an interactive browser 104 for providing an interactive user interface on a browser. The one or more sets of instructions in the application server 110 may provide an interactive user interface through the interactive browser 104. A cloud server 130 provides a cloud service to the client application 112 for a user using the client device 102. The network 160 provides network connectivity among the client device 102, the application server 110, and the cloud server 130. The fault-enabled SDK 114 includes an application programming interface 116 (API), a transport layer 118, a network layer 120, a fault log store 122, and a fault configuration data store 124. The fault-enabled SDK 114 provides an interface of commands to the client application 112 to use a cloud service (e.g., storing and reading data from a cloud storage service). The API 116 includes a set of commands and/or public methods for the client application 112. The API 116 interfaces the transport layer 118 in the fault-enabled SDK 114. The transport layer 118 processes one or more cloud commands that the client application 112 requests and returns a result of the requested commands. The transport layer 118 in turn issues a command to the network layer 120. The network layer 120 transmits a command received from the transport layer 118 to a network layer 136 of the cloud server 130. The fault log store 122 stores a collection of failures in processing commands. For example, information about a failure may include a timestamp, a type of a failure, a requesting application, and a cloud server.

In aspects, the fault log includes faults as described by documentations associated with an SDK, bug reports, execution traces, and the like. For example, SDK documents may be parsed to identify faults according to the technical specifications and APIs.

The fault configuration data store 124 stores fault configuration data. The fault configuration data includes entries of faults, describing types of faults and locations in the SDK to generate faults to test the client application 112. For example, an entry of the fault configuration data may indicate a fault corresponding to an authentication error in the transport layer 118 as a result of transmitting a GET command to read data from an object in a cloud storage. The fault-enabled SDK 114, when enabled to generate a simulated fault, generates the authentication error in the network layer 118 when the client application 112 invokes a public method of the API 116 to read data from an object from a cloud storage.

The cloud server 130 performs requests associated with a cloud service. The cloud server 130 includes a cloud server application 132, a transport layer 134, and a network layer 136. In aspects, the cloud server application 132 includes a cloud storage service application. For example, the cloud storage service provides a storage space to store data for the client application 112. The network layer 136 of the cloud server 106 receives a request from the network layer 120 of the fault-enabled SDK 114 associated with the client application 112 in the application server 110. Using an example of the cloud storage service as an example, the cloud server 130 may provide a cloud storage service to the client application 112. A command for performing the cloud storage service may include but not limited to reading, writing, modifying, and deleting data in the cloud storage.

In the normal course of processing requests without a fault, the client application 112 uses the API 116 of the fault-enabled SDK 114 in the application server 110 to place a request to process data in the cloud (e.g., storing data in the cloud storage). The API 116 may include a command to process data in the cloud storage as specified by the client application. The API 116 in turn instructs the transport layer 118 to transmit the request to the cloud server application 132 in the cloud server 130. The transport layer 118 then instructs the network layer 120 of the fault-enabled SDK 114 to transmit a cloud storage command with parameters as specified by the client application 112 via the API 116 over the network 160 to the network layer 136 of the cloud server 130.

In aspects, the network layer 120 establishes a network connection with the network layer 136 of the cloud server 106 over the network 160. The network layer 120 transmits the cloud storage command with data associated with the command to the network layer 136 of the cloud server 106.

The network layer 136 in the cloud server 130 then receives the command and data associated with the command. The network layer 136 provides the command and the data to the transport layer 134, which in turn provides them to the cloud server application 132. The cloud server application 132, upon receiving the command and the data, performs the command (e.g., stores the data in the cloud storage). The cloud server application 132 provides a result of performing the command to the transport layer 134. The transport layer 134 instructs the network layer 136 to transmit the result status of performing the command accordingly. The network layer 136 of the cloud server 130 transmits the result status to the network layer 120 on the application server 110.

In aspects, the network layer 120 in the fault-enabled SDK 114 of the application server 110 receives the result status of performing the command in the cloud service. The network layer 120 sends the result status to the transport layer 118. The transport layer 118 processes the result status and provides the result status to the API. The API 116 returns a result of the API command to the client application 112. In aspects, the network layer 120 or other parts of the SDK or underlying systems may store the result status in a fault log store 122. For example, the network layer 120 may store a result in the fault log store 122 when the result includes an error in performing the cloud request.

Protocols for the communications between the network layer 120 of the fault-enabled SDK 114 and the network layer 136 of the cloud server 130 may be in various forms. For example, the protocol may be based on REST (or RESTful) API (i.e., REST stands for Representative State Transfer), a protocol used for web services.

In aspects, the fault-enabled SDK 114 generates a failure while performing a command from the client application 112 for testing the client application 112. The fault-enabled SDK 114 may generate the failure in the API 116, the transport layer 118, and in the network layer 120. In aspect, the transport layer 118 may generate or simulate a fault by replacing otherwise a varying result of a command to the transport layer with a fixed fault (e.g., an HTTP authentication error). In another aspect, the network layer 120 may generate a failure associated with network connectivity regardless of the actual status of the network 160. When the network layer 120 uses the REST API for interacting with the cloud server 130, the network layer 120 may return an error to the transport layer 118 as if the network layer 120 received a 401 error (e.g., a network authentication error) from the network layer 136 of the cloud server 130.

The fault-enabled SDK 114, enabled to generate a fault in response to API calls from the client application 112, enables testing the client application 112 in a controlled manner. The fault-enabled SDK 114 may contain the simulated fault within the fault-enabled SDK 114. The contained faults may eliminate causing failures in other applications and programs in the application server 110. Furthermore, the ability of the fault-enabled SDK 114 generating the failures removes the needs for the application developers to modify the program codes of the client application 112 because the client application 112 uses the fault-enabled SDK 114 for testing in the same way that the client application 112 uses the fault-enabled SDK 114 in the production environment. The disclosed technology may provide the fault-enabled SDK 114 in two versions: a production version without an ability to generate failures and a test version with the ability to generate failures. In some other aspect, the fault-enabled SDK 114 may be include a flag that switches functionality of the fault-enabled SDK 114 between the production mode and the test mode. The fault-enabled SDK 114 in the test mode may generate failures for testing the client application 112. The fault-enabled SDK 114 in the production mode does not cause the failure for testing.

In aspects, the fault-enabled SDK 114 determines a set of failures to generate in response to commands based on a frequency of failures that occur in actual user of the cloud services. The network layer 120 may log failures in the fault log store 122 when the network layer 120 receives an error (e.g., the HTTP 401 Unauthorized client error in the REST API) from the cloud server 130. The network layer 120 analyzes the failures in the fault log store 122 and determines a set of failures that have occurred more often than a predetermined threshold. The network layer 120 stores information associated with the set of failures to generate (and/or simulate) in the fault configuration data store 124.

The fault configuration data store 124 includes a set of faults and settings of whether to generate respective failures for testing the client application 112. For example, the fault configuration data may specify whether to generate a failure that results from the 401 error from the cloud server 130.

The fault-enabled SDK generator 140 generates a fault-enabled SDK based on a given SDK. The fault-enabled SDK generator 140 includes an SDK receiver 142, a fault determiner 144, a fault injector 146, a fault configuration data generator 148, and a fault-enabled SDK transmitter 150. The SDK receiver 142 receives an SDK (and/or a library code). The fault-enabled SDK generator 140 generates a fault-enabled SDK (e.g., the fault-enabled SDK 114) based on the received SDK.

The fault determiner 144 determines one or more faults to generate (and/or simulate) in the received SDK. In aspects, the fault determiner 144 analyzes code in the received SDK to identify commands and public methods that are available as API 116 to the client application 112 to use. The fault determiner 144 further determines faults associated with respective public methods of the API 116 either by analyzing the binary code of the received SDK or information (e.g., a documentation) associated with the received SDK. In some other aspects, the fault determiner 144 retrieves a fault log from the fault log store 122 of the received SDK. Based on the fault log, the fault determiner 144 determines one or more faults that occur at a frequency that is higher than a predetermined threshold. In aspects, the fault determiner 144 determines a part (e.g., the API 116, the transport layer 118, and the network layer 120) of the received SDK to generate the one more faults.

The fault injector 146 injects code that generates the determined faults in the received SDK. In aspects, the fault injector 146 may inject code in the transport layer 118 of the received SDK by replacing a normal result received from the network layer 120 with an error code associated with the determined fault. In some other aspects, the fault injector 146 injects code that causes a fault in the network layer 120 of the received SDK; the network layer 120 returns an authentication error without transmitting a request to the cloud server 130 over the network 160. The fault injector 146 generates a fault-enabled SDK (e.g., the fault-enabled SDK 114).

Traditional systems generate faults within a system infrastructure (e.g., physical network connectivity and electric power for the servers and routers) by causing actual faults. The infrastructure-level fault injection is a real failure. However, the faults tend to be coarse and not finely tunable/controllable by the application tester. Additionally or alternatively, the traditional system may create mock/fake failures by modifying the application or the API code without terminating external network and/or services. The fault injections at the API-level and at the application-level may provide a detailed control over faults but require detailed knowledge about internals of APIs and SDKs by the application tester to test the application with faults in a meaningful manner.

The fault configuration data generator 148 generates fault configuration data according to the injected faults in the received SDK. The fault configuration data is associated with the received SDK. The fault configuration data store 124 for the received SDK stores the fault configuration data for the received SDK. The fault configuration data include information associated with availability of respective faults, which may be enabled to be generated (and/or simulated) by the received SDK.

The fault-enabled SDK transmitter 150 transmits the received SDK with injected faults and the fault configuration data. In aspects, the fault-enabled SDK transmitter 150 transmits the received SDK to the application server 110 to test the client application 112.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

In traditional testing of client applications, controlled fault injections at the SDK-level have not been available to testers of client applications because SDKs tend to be black boxes to the developers and testers of client applications. Details of faults that may be result from internal errors of the SDK have been opaque to the client applications. For example, varying frequencies of respective faults raised by the traditional SDKs may be unknown to the developers and testers of client applications. Testing a client application, which uses a remote service (e.g., a cloud service), includes testing various faults that occur remotely. The faults may be raised not by the local client device but by application servers and cloud servers over the network. The disclosed technology provides a structure and a method to automatically generate: 1) a combination of a fault-enabled SDK, and 2) a fault configuration data for the fault-enabled SDK. The combination enables the developers and testers of client applications to control types of faults to simulate and test the client applications without modifying the code for the client applications.

Figure 2:
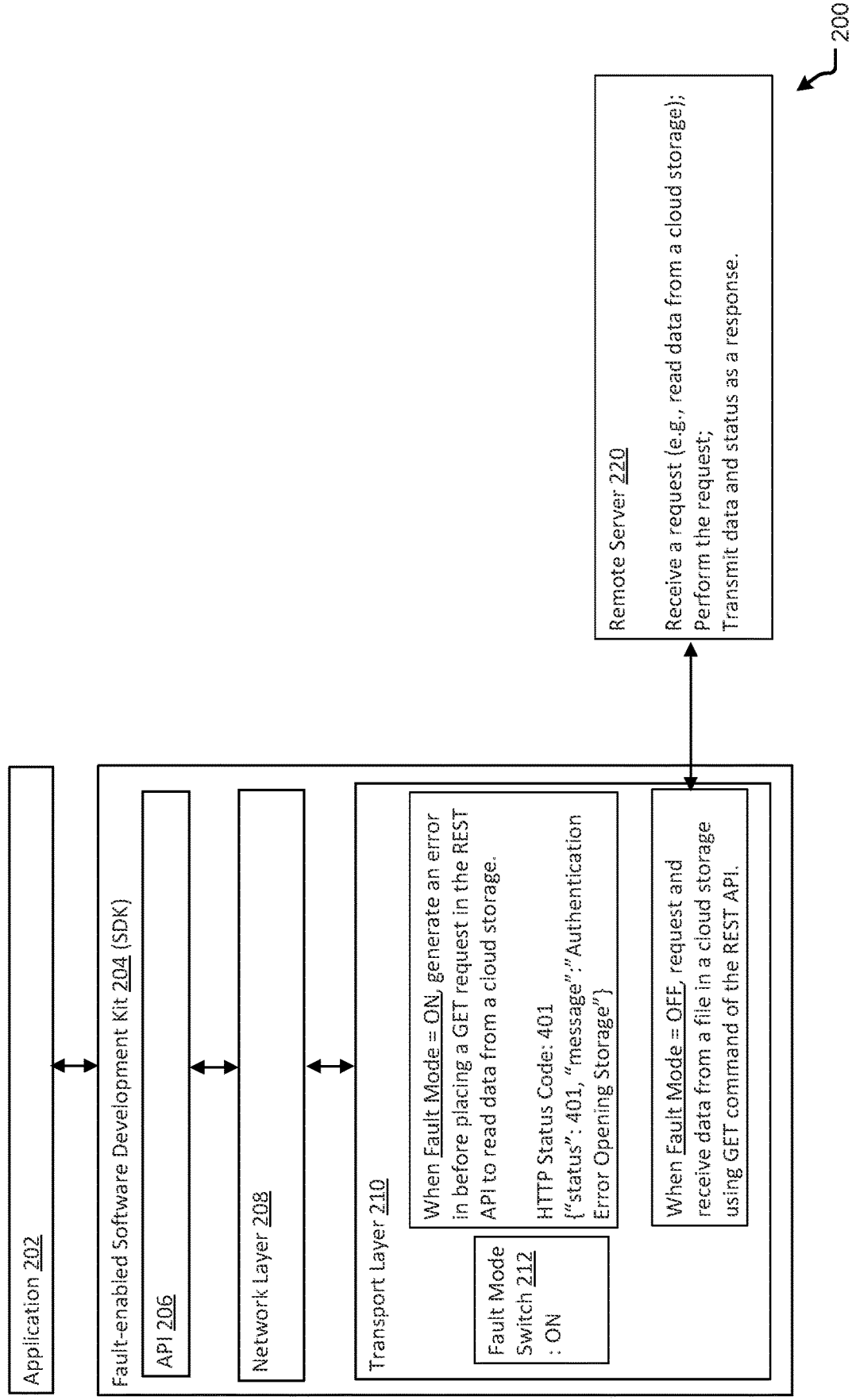
FIG. 2 illustrates an overview of an example system for generating a failure in an SDK for testing an application in accordance with aspects of the present disclosure.

FIG. 2 illustrates an example system that generates a fault using a fault-enabled SDK for testing an application in accordance with aspects of the present disclosure. The system 200 includes an application 202, a fault-enabled SDK 204, and a remote server 220. The application 202 connects to the fault-enabled SDK 204. The fault-enabled SDK 204 communicates with the remote server 220.

The fault-enabled SDK 204 includes a fault mode switch 212. The fault mode switch 212 switches a mode of the fault-enabled SDK 204 between a production mode and a fault mode. In aspects, application developers and testers may change settings of the fault mode switch 212 by modifying the fault configuration data (e.g., in the fault configuration data store 124 as shown in FIG. 1).

In the production mode (e.g., the fault mode switch 212 is OFF), the fault-enabled SDK 204 receives commands from the application 202 through the API 206 and transmits the command to the remote server 220 for performing the command. The fault-enabled SDK 204 returns a result of performing the command to the application 202. In aspects, the transport layer 210 sends a GET command of the REST API to the remote server 220. The remote server 220 (e.g., a cloud storage server) receives the request for reading data from a cloud storage, performs the request, and transmits data from the cloud storage and status to the transport layer 210 of the fault-enabled SDK 204. The transport layer 210 sends the status to the network layer 208. The network layer 208 returns the result to the API 206. Accordingly, the API 206 returns the result to the application 202.

In the fault test mode, the fault-enabled SDK 204 generates a fault as if the request to the remote server 220 has failed and returned an error (e.g., HTTP Status Code: 401 {"status": 401, "message": "Authentication Error Opening Storage"}). In aspects, the transport layer 210 of the fault-enabled SDK 204 generates the fault (e.g., the 401 error) according to the fault configuration data. The transport layer 210 returns the fault to the network layer 208. The network layer 208 processes the error and further returns a result of executing a command to the API 206. In some other aspects, the network layer 208 generates (and/or simulates) the fault when the fault configuration data specifies the network layer 208 for generating the fault. The API 206 processes the erroneous status from the network layer 208 and returns the error to the application 202.

As will be appreciated, the various methods, devices, applications, features, etc., described with respect to FIG. 2 are not intended to limit the system 200 to being performed by the particular applications and features described. Accordingly, additional controller configurations may be used to practice the methods and systems herein and/or features and applications described may be excluded without departing from the methods and systems disclosed herein.

FIG. 3A illustrates an example of fault configuration data according to aspects of the present disclosure. The example 300A illustrates exemplar configurations for generating a various types of faults in response to commands received from the client application. In aspects, the fault configuration data 302 includes command name 304, layer 306, fault mode 308, and a fault description 310. The command name 304 indicates a name of command for which to generate a fault. The layer 306 indicates a software layer (e.g., an API, a network layer, and a transport layer) in the SDK to generate faults. The fault mode 308 indicates a mode that determines whether to generate a fault. The fault mode 308 "OFF" indicates that the SDK does not generate a fault for testing the application. The fault mode 308 "ON" indicates that the SDK generates faults for testing the application. The fault description 310 indicates a type of fault that the SDK generates. For example, a command name may be "Read Object" processed by a network layer, and its fault mode if currently "OFF." In another example, the transport layer generates a fault in the Get Object command for reading data from a cloud storage by returning the 401 error (i.e., authentication error) to the network layer to process the artificially generated fault. The transport layer does not actually communicate over the network with the cloud server but generates the fault by returning the 401 error.

FIG. 3B illustrates an example of a fault log according to aspects of the present disclosure. The example 300B illustrates an exemplar fault log. The log includes records of faults that the SDK has encountered. A fault log 342 includes timestamp 344, command 346, fault status 348, and target server 350. In aspects, the fault log 342 records faults that the transport layer has encountered in communicating with the cloud server.

For example, a fault may include a Get command (e.g., a Get request in the REST API for a cloud storage service) with a timestamp "202105100810" with a fault error code 401, in interactions with a cloud server "Cloud_Storage-001." Another fault may indicate a fault error code 401 in response to issuing a Copy command to the cloud server "Cloud_Storage-001."

Figure 4:
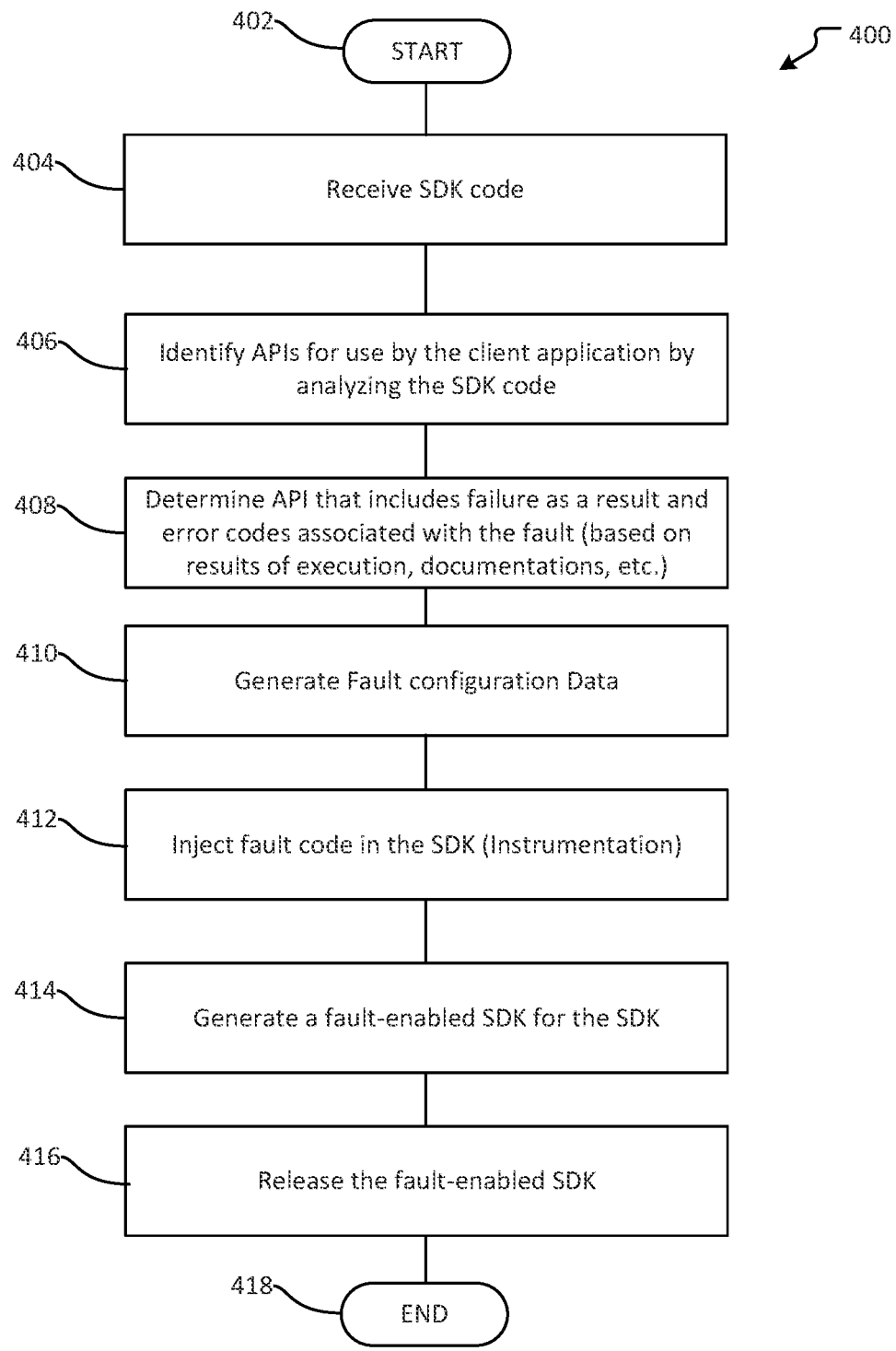
FIG. 4 illustrates an overview of an example system with a transport layer of an SDK for generating a failure in accordance with aspects of the present disclosure.

FIG. 4 is an example of a method for generating a fault-enabled SDK in accordance with aspects of the present disclosure. A general order of the operations for the method 400 is shown in FIG. 4. Generally, the method 400 begins with start operation 402 and ends with end operation 418. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1, 2, 3A, 3B, 5, 6, 7, and 8A-B.

Following start operation 402, the method 400 begins with receive operation 404, which receives code associated with a software development kit (SDK). In aspects, the SDK may include a binary code of the SDK for production use.

Identify operation 406 identifies API associated with the SDK code by analyzing the SDK code. In aspects, the API represents a set of public functions or method of objects, which a client application uses. The API provides functions of the SDK (e.g., a cloud storage service) to the client application.

Determine operation 408 determines a set of faults (and/or failures) and error codes associated with the faults as supported by the identified API. In aspects, the determine operation 408 receives (or retrieves) a fault log associated with use of the SDK. For example, the fault log may include timestamps, an identifier of an API that processed the error, and types of the error. The determine operation 408 may identify faults that have occurred more often than a predetermined frequency threshold. In aspects, the determine operation 408 may determine a subset of faults to generate based on a frequency of respective faults. In aspects, the determine operation 408 determines and stores faults in the fault log based on information from SDK documentations (e.g., specifications for the API and the SDK).

Generate operation 410 generates fault configuration data. In aspects, the fault configuration data includes a list of faults that a fault-enabled SDK generates. The fault configuration data further includes indications of whether the fault-enabled SDK generates respective faults for respective API.

Inject operation 412 injects a set of code that generate faults in the SDK. For example, the inject operation 412 injects codes that simulates a fault. The fault may indicate a network disconnect. The code may return a network timeout error to a command that attempts establishing a connection with a remote server. In some other aspects, the inject operation 412 injects an authentication error (e.g., an HTTP return code 401 for an authentication fault) in processing a command that includes an authentication of a client at a remote server. In aspects, the inject operation 412 may be termed as instrumentation of the SDK to generate a fault-enabled SDK. In some other aspects, the inject operation 412 injects faults in the SDK based on the fault configuration data. For example, when the fault configuration data instructs generating a fault indicating a user authentication in a read data command, the inject operation 412 injects and enables code that generates a user authentication error.

Generate operation 414 generates a fault-enabled SDK. The fault enabled SDK includes a set of code that generates faults as specified by the fault configuration data. Additionally or alternatively, the generate operation 414 generates an updated SDK that includes the additional code that generate faults.

Release operation 416 releases the fault-enabled SDK to a client application for use. In aspects, the fault-enabled SDK may be distinct from the SDK for production use. In aspects, method 400 may end with end operation 418. In aspects, the method 400 may automatically generate the fault-enabled SDK based on the received SDK.

As should be appreciated, operations 402-418 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 5:
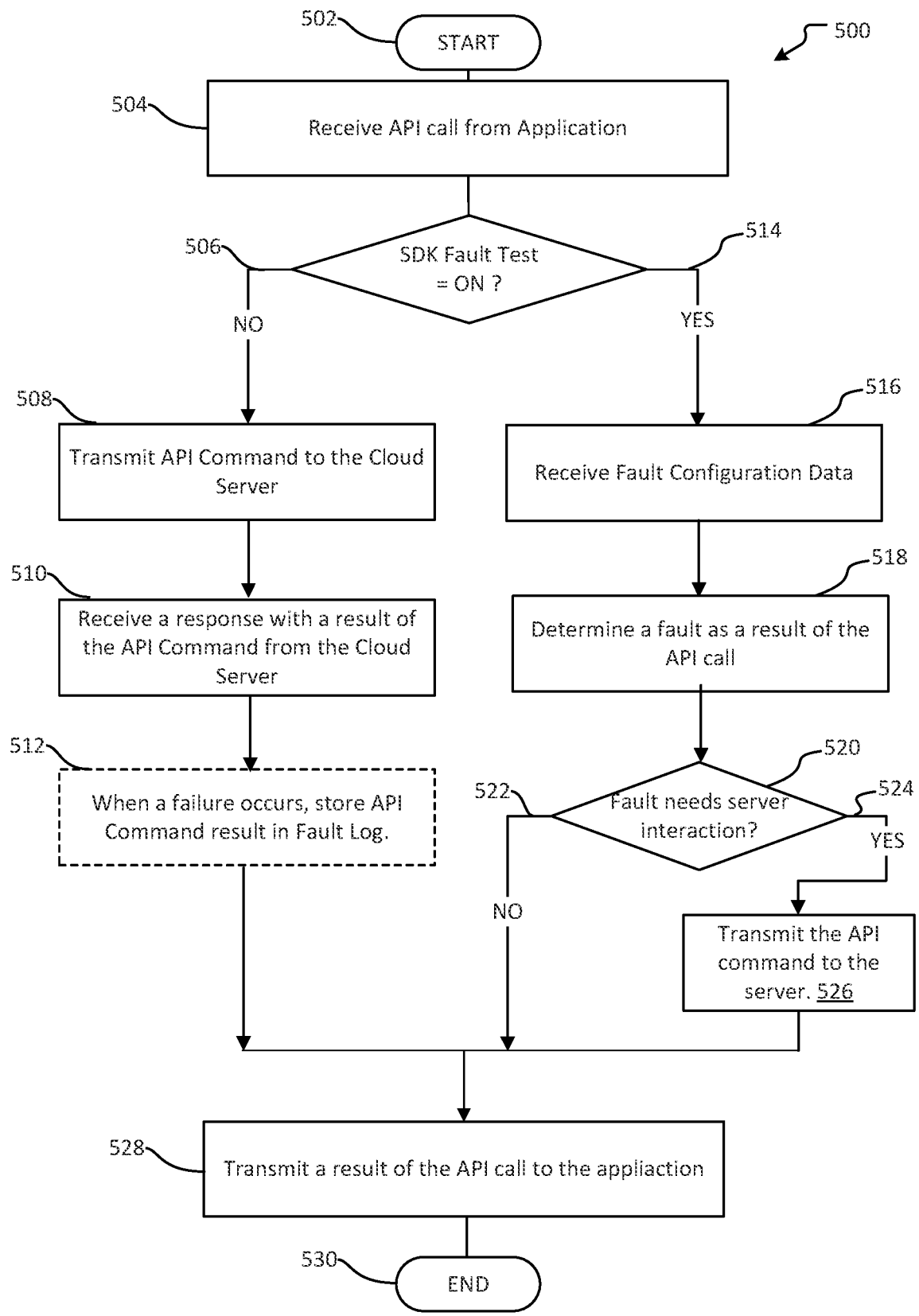
FIG. 5 illustrates an example of a method for generating a failure for testing an application in accordance with aspects of the present disclosure.

FIG. 5 is an example of a method for generating a fault in a fault-enabled SDK in accordance with aspects of the present disclosure. A general order of the operations for the method 500 is shown in FIG. 5. Generally, the method 500 begins with start operation 502 and ends with end operation 530. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3A, 3B, 4, 6, 7, and 8A-B.

Following start operation 502, the method 500 begins with receive operation 504, which receives an API call from an application. For example, the application may use a cloud storage service by invoking a public method of an API associated with an SDK. The SDK may be associated with a cloud storage service. The API call may include a command to read data from a cloud storage, for example. In aspects, the SDK includes an ON/OFF switch that sets the SDK between a production mode and a fault-enabled (test) mode.

When the fault test mode is NO 506 (that is, the production mode), the method 500 proceeds to transmit operation 508. The transmit operation 508 transmits the command to the cloud server for processing the command. Receive operation 510 receives a response with a result of the command from the cloud server.

Additionally or alternatively, when the receive operation 510 receives a fault (or failure in processing the client request), store operation 512 stores the command and the fault result in a fault log store (e.g., the fault log store 122 as shown in FIG. 1). The fault log includes a list of faults, which occurred in processing requests from the application.

When the fault test mode is YES 514, the method 500 proceeds to receive operation 516, which receives the fault configuration data (e.g., the fault configuration data store 124 as shown in FIG. 1). In aspects, the fault configuration data specifies which faults to enable in the fault test mode of the SDK. For example, the fault configuration data may specify generating an authentication fault (e.g., HTTP status 401) while processing a GET data command in the REST API to access the cloud server for reading data from a cloud storage.

Determine operation 518 determines a fault to generate as a result of the API call. For example, the SDK determines the transport layer to generate an authentication error (e.g., HTTP status 401) while processing a GET data command in the REST API to access the cloud server. In aspects, the determine operation 518 determines the fault to generate based on the fault configuration data. Accordingly, the transport layer of the SDK generates the error and returns the API call accordingly. In aspects, the SDK is a fault-enabled SDK where the fault-enabled SDK generator previously injected code for generating the fault to test the application.

A decision operation 520 decides whether the fault needs an interaction with a server. For example, a timeout fault may need the API command operation to be propagated to the server and wait for a timeout error from the server by fault injection. When the fault needs a server interaction 524, transmit operation 526 transmits the API command to the server for processing. In aspects, the method 500 waits for a return from the server to continue to a transmit operation 528. When the fault does not need the server interaction 522, the method 500 proceeds to the transmit operation 528.

Transmit operation 528 transmits a result of the API call to the application. For example, when the SDK has its fault test mode ON, the SDK returns an error based on its transport layer generating a fault (e.g., the HTTP status 401) as specified by the fault configuration data. The method 500 ends with the end operation 530.

As should be appreciated, operations 502-530 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
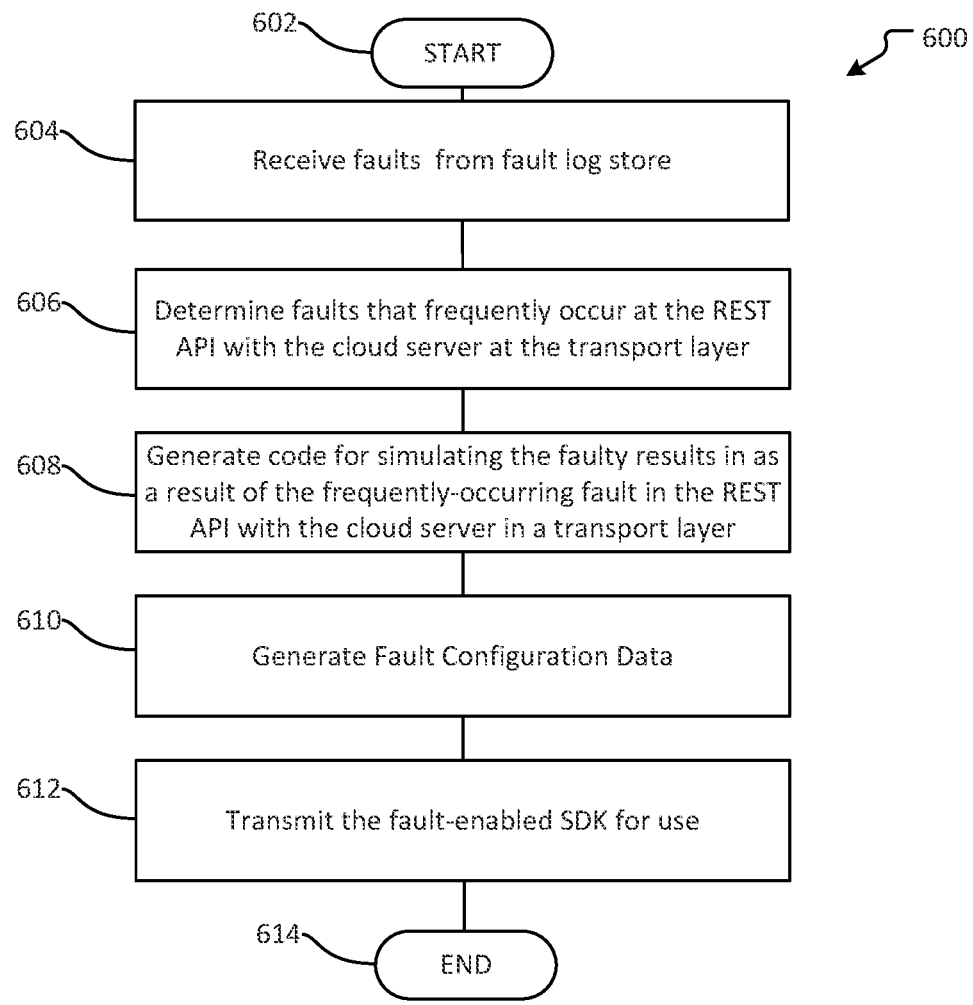
FIG. 6 illustrates an example of a method for generating a fault-enabled SDK and fault configuration data in accordance with aspects of the present disclosure.

FIG. 6 is an example of a method for automatically generating a fault-enabled SDK that generates faults in accordance with aspects of the present disclosure. A general order of the operations for the method 600 is shown in FIG. 6. Generally, the method 600 begins with start operation 602 and ends with end operation 614. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3A, 3B, 4, 5, 7, and 8A-B.

Following start operation 602, the method 600 begins with receive operation 604, which receives fault data from a fault log store (e.g., the fault log store 122 in FIG. 1). In aspects, the fault data includes time, an identifier of software parts (e.g., the transport layer of the SDK), a description of a command request to the remote server, and a result that indicates a fault). In aspects, the faults in the fault log may originate from sources that is not limited to faults that actually occur in use of the API commands. Additionally or alternatively, the faults in the fault log may originate from documentations associated with the SDK and the API (e.g., API specifications). For example, the receive operation 604 may parse the documentations and extract information associated with faults and store information about the faults in the fault log in the fault log store 122.

Determine operation 606 determines one more faults that frequently occur based on the fault history data.

Generate operation 608 generates code that simulates the fault. For example, the determine operation 606 determines that fault history data includes the authentication error (the 401 error) in the GET command of a cloud storage service more often than a predetermined threshold. In aspects, the fault log store stores faults that occur in use of a REST API through which the transport layer of the SDK transmits requests for processing data at a cloud service in a remote cloud server. Parameters and a syntax used by the REST API are based on HTTP and XML-based data in a text format. Accordingly, injecting faults includes adding the simulated fault in the code of the transport layer and replace the normal version of the transport layer with the fault-enabled transport layer. Code associated with other layers (e.g., API and the network layer) remain the same.

Generate operation 610 generates the fault configuration data based on the injected faults in the SDK. In aspects, the generate operation 610 generates a fault-enabled SDK. The fault-enabled SDK may be a combination of the injected faults in the SDK, and the fault configuration data that configures (e.g., fault test mode ON/OFF) the injected faults for the SDK.

Transmit operation 612 transmits the fault-enabled SDK for use to test applications. In aspects, the transmit operation 612 transmits the fault-enabled SDK to an application server for testing client applications that use the fault-enabled SDK. In aspects, the method 600 may end with end operation 614.

As should be appreciated, operations 602-614 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
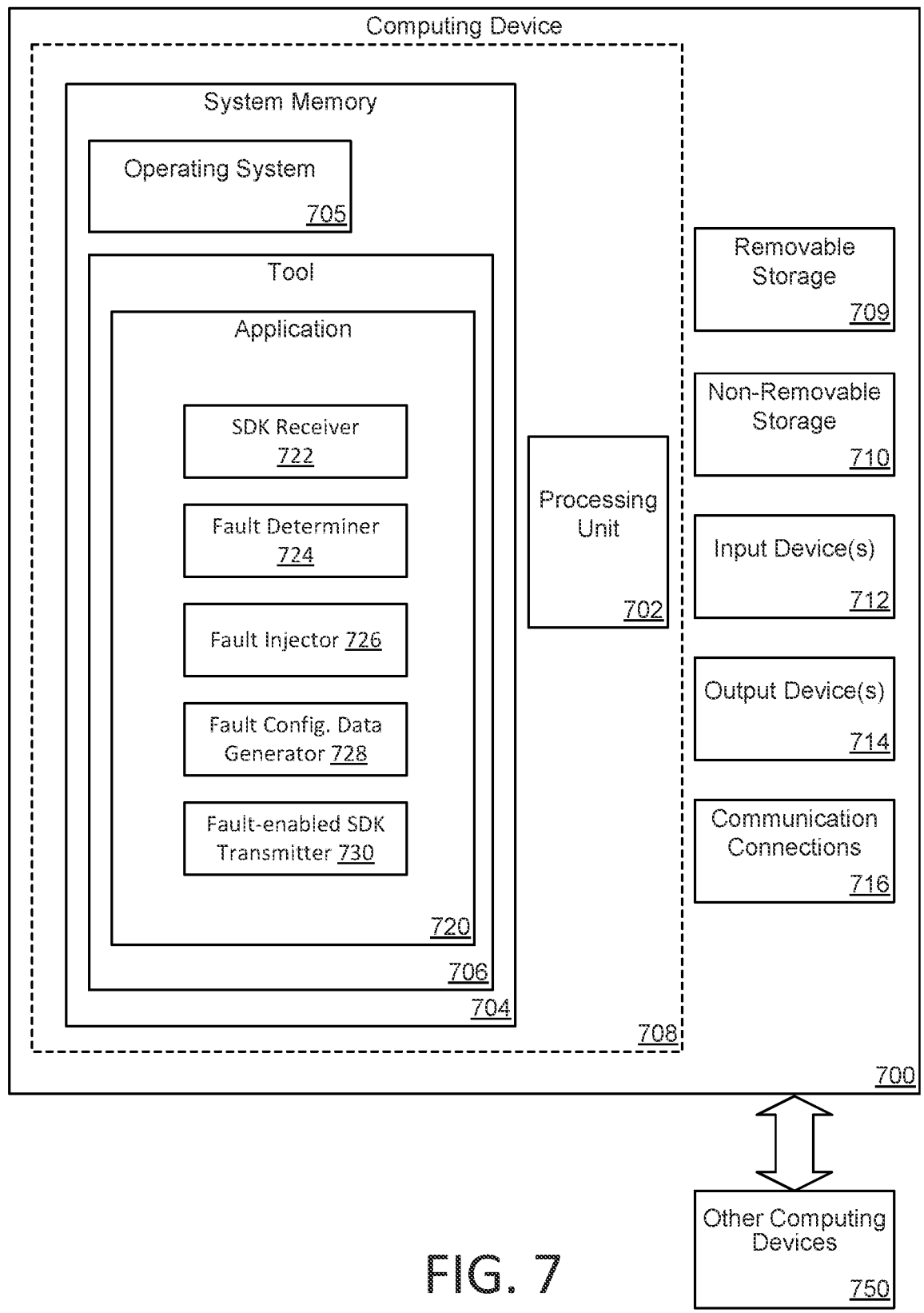
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes an SDK receiver 722, a fault determiner 724, a fault injector 726, a fault configuration data updater 728, and a fault-enabled SDK transmitter 730, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
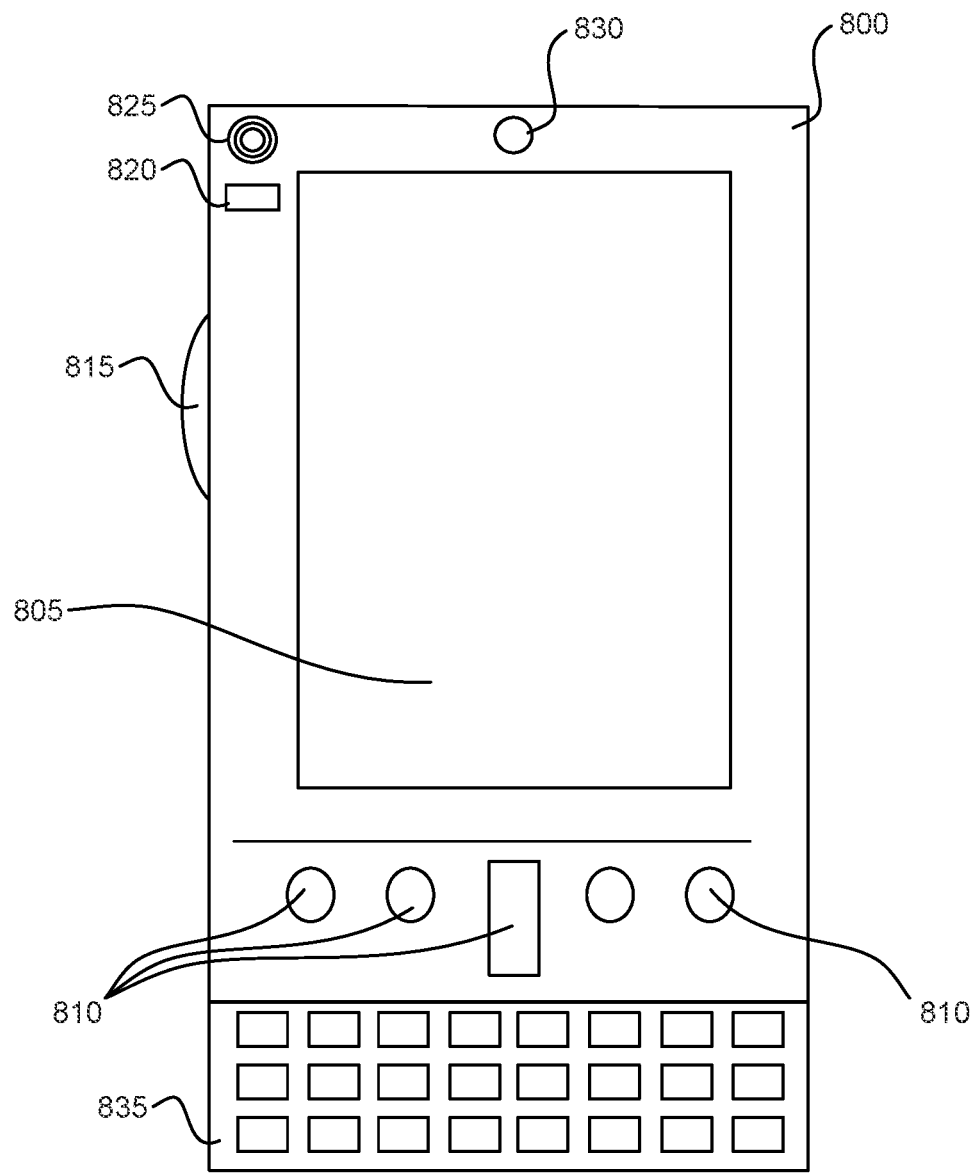
FIG. 8A is a simplified diagram of a mobile computing device with which aspects of the present disclosure may be practiced.
Figure 8B:
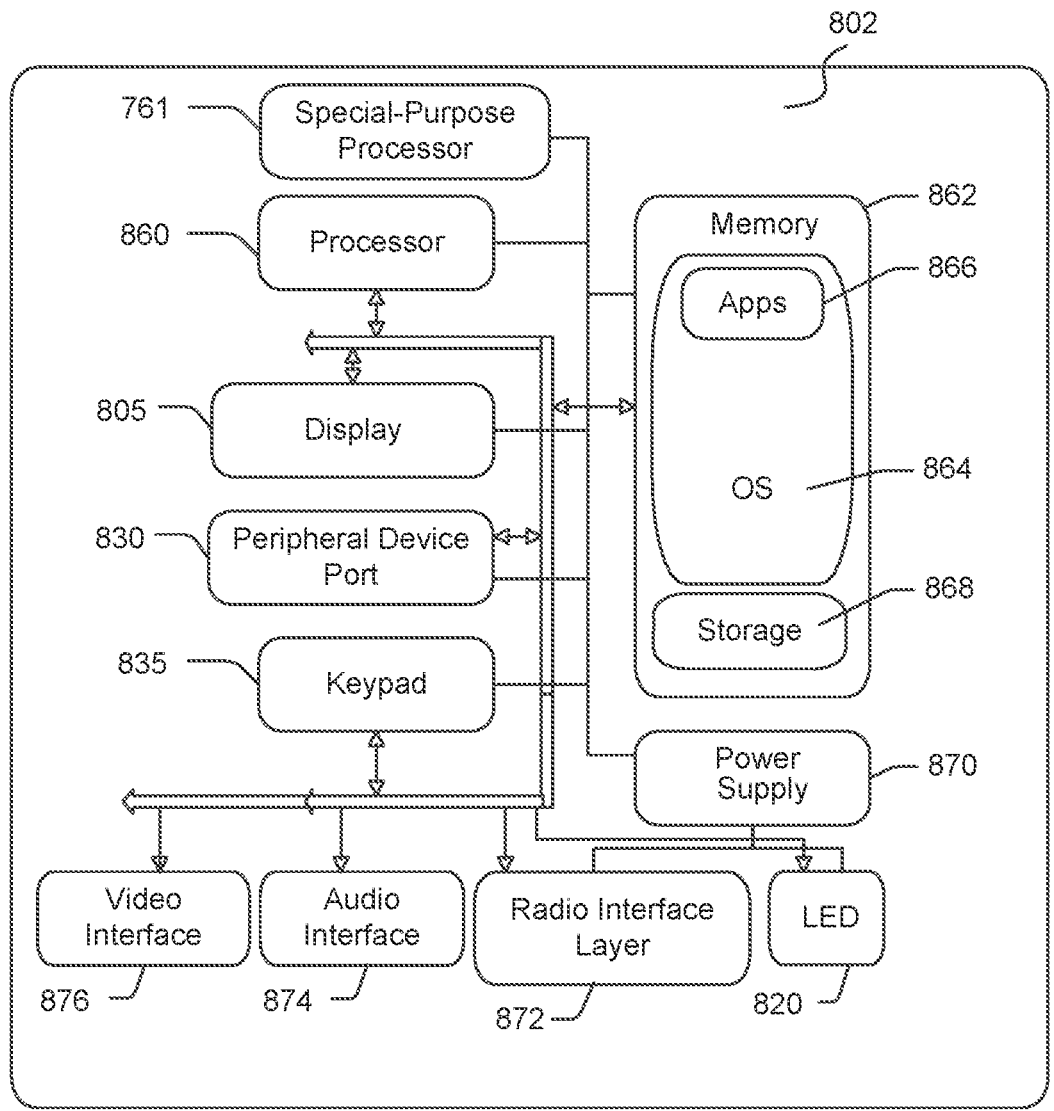
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., user of client device 102 in FIG. 1) may be a mobile computing device. With reference to FIG. 8A, one aspect of a mobile computing device 800 for implementing the aspects is illustrated. In a basic configuration, the mobile computing device 800 is a hand-held computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., an application server 110 and a fault-enabled SDK generator 140, and a cloud server 130 in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for generating a fault-enabled SDK according to at least the examples provided in the sections below. As will be understood from the foregoing disclosure, one aspect of the technology relates to a computer-implemented method of automatically generating a fault-enabled software development kit (SDK). The method comprises retrieving a fault log associated with an SDK; determining, based on the retrieved fault log and a predetermined threshold of a frequency of fault occurrence, a fault to inject in the SDK; automatically injecting the fault in the SDK to generate the fault-enabled SDK to test a client application; generating a fault configuration data; and transmitting the fault-enabled SDK and the fault configuration data. The method further comprises ranking, based on the frequency of fault occurrence, faults in the fault log; and determining the fault to inject in the SDK, wherein the fault is the highest ranked fault in the ranked faults in the fault log. The SDK includes: an application programming interface (API), a network layer, and a transport layer, wherein the API interfaces a client application, wherein the transport layer transmits a request for processing data to a remote server using a Representative State Transfer (REST) API, and wherein the transport layer includes the automatically injected fault as a status of the request using the REST API. The SDK includes a fault test switch, and the method further comprises receiving an API call from the client application; and generating, based on the fault test switch, the fault associated with the received API call to test the client application. The SDK corresponds to cloud service, and wherein the REST API includes a cloud service API. The fault configuration data includes at least one of an identifier of a fault, a location of the fault in the SDK, an indicator indicating whether to generate the fault, and one or more parameters associated with the fault. The fault-enabled SDK is distinct from the SDK. The computer-implemented method of claim 4, the method further comprises generating, by the fault-enabled SDK based on a status of the fault test switch, the fault according to the fault configuration data; and providing the fault in response to the received API call from the client application.

Another aspect of the technology relates to a system for automatically generating a fault-enabled SDK. The system comprises a processor; and a memory storing computer-executable instructions that when executed by the processor cause the system to determine, based on the retrieved fault log and a predetermined threshold of a frequency of fault occurrence, a fault to inject in the SDK; automatically inject the fault in the SDK to generate the fault-enabled SDK to test a client application; generate a fault configuration data; and transmit the fault-enabled SDK and the fault configuration data. The computer-executable instructions further cause the system to rank, based on the frequency of fault occurrence, faults in the fault log; and determine the fault to inject in the SDK, wherein the fault is the highest ranked fault in the ranked faults in the fault log. The SDK includes an application programming interface (API), a network layer, and a transport layer, wherein the API interfaces a client application, wherein the transport layer transmits a request for processing data to a remote server using a Representative State Transfer (REST) API, and wherein the transport layer includes the automatically injected fault as a status of the request using the REST API. The SDK includes a fault test switch, and the computer-executable instructions further cause the system to receive an API call from the client application; and generate, based on the fault test switch, the fault associated with the received API call to test the client application. The SDK corresponds to cloud service, and wherein the REST API includes a cloud service API. The fault configuration data includes at least one of an identifier of a fault, a location of the fault in the SDK, an indicator indicating whether to generate the fault, and one or more parameters associated with the fault. The fault-enabled SDK is distinct from the SDK.

In still further aspects, the technology relates to a computer-readable non-transitory recording medium storing computer-executable instructions. The computer-executable instructions when executed further causing the system to determine, based on the retrieved fault event log and a predetermined threshold of a frequency of fault occurrence, a fault to inject in the SDK; automatically inject the fault in the SDK to generate the fault-enabled SDK to test a client application; generate a fault configuration data; and transmit the fault-enabled SDK and the fault configuration data. The computer-executable instructions when executed further causing the system to: rank, based on the frequency of fault occurrence, faults in the fault event log; and determine the fault to inject in the SDK, wherein the fault is the highest ranked fault in the ranked faults in the fault event log. The SDK includes an application programming interface (API), a network layer, and a transport layer, wherein the API interfaces a client application, wherein the transport layer transmits a request for processing data to a remote server using a Representative State Transfer (REST) API, and wherein the transport layer includes the automatically injected fault as a status of the request using the REST API. The SDK includes a fault test switch, and the method further comprises receiving an API call from the client application; and generating, based on the fault test switch, the fault associated with the received API call to test the client application.

Any of the one or more above aspects in combination with any other of the one or more aspect. Any of the one or more aspects as described herein.

What is claimed is:

1. A computer-implemented method of automatically generating a fault-enabled software development kit (SDK), the method comprising:
   retrieving a fault log;
   determining, based on the retrieved fault log and a predetermined threshold of a frequency of fault occurrence, a fault to inject in an SDK;
   automatically injecting the fault in the SDK to generate the fault-enabled SDK to test a client application;
   generating a fault configuration data; and
   outputting the fault-enabled SDK and the fault configuration data.

2. The computer-implemented method of claim 1, the method further comprising:
   ranking, based on the frequency of fault occurrence, faults in the fault log; and
   determining the fault to inject in the SDK, wherein the fault is the highest ranked fault in the ranked faults in the fault log.

3. The computer-implemented method of claim 1, wherein:
   the SDK includes an application programming interface (API), and
   the API interfaces a client application.

4. The computer-implemented method of claim 3, wherein:
   the SDK includes a transport layer,
   the transport layer transmits a request for processing data to a remote server using a Representative State Transfer (REST) API, and
   the transport layer includes the automatically injected fault as a status of the request using the REST API.

5. The computer-implemented method of claim 4, wherein the SDK includes a fault test switch, and the method further comprising:
   receiving an API call from the client application; and
   generating, based on the fault test switch, the fault associated with the received API call to test the client application.

6. The computer-implemented method of claim 4, wherein the SDK corresponds to cloud service, and wherein the REST API includes a cloud service API.

7. The computer-implemented method of claim 3, wherein the fault configuration data includes at least one selected from a group consisting of:
- an identifier of a fault,
- a location of the fault in the SDK,
- an indicator indicating whether to generate the fault, and
- one or more parameters associated with the fault.

8. The computer-implemented method of claim 5, the method further comprising:
- generating, by the fault-enabled SDK based on a status of the fault test switch, the fault according to the fault configuration data; and
- providing the fault in response to the received API call from the client application.

9. A system for automatically generating a fault-enabled SDK, the system comprises:
- a processor; and
- a memory storing computer-executable instructions that when executed by the processor cause the system to:
  - determine, based on a retrieved fault log and a predetermined threshold of a frequency of fault occurrence, a fault to inject in an SDK;
  - automatically inject the fault in the SDK to generate the fault-enabled SDK to test a client application;
  - generate a fault configuration data; and
  - output the fault-enabled SDK and the fault configuration data.

10. The system of claim 9, the computer-executable instructions further cause the system to:
- rank, based on the frequency of fault occurrence, faults in the retrieved fault log; and
- determine the fault to inject in the SDK, wherein the fault is the highest ranked fault in the ranked faults in the retrieved fault log.

11. The system of claim 9, wherein:
- the SDK includes a transport layer,
- the transport layer transmits a request for processing data to a remote server using a Representative State Transfer (REST) API, and
- the transport layer includes the automatically injected fault as a status of the request using the REST API.

12. The system of claim 11, wherein:
- the SDK includes an application programming interface (API), and
- the API interfaces a client application.

13. The system of claim 12, wherein the SDK includes a fault test switch, and the computer-executable instructions further cause the system to:
- receive an API call from the client application; and
- generate, based on the fault test switch, the fault associated with the received API call to test the client application.

14. The system of claim 12, wherein the SDK corresponds to cloud service, and wherein the REST API includes a cloud service API.

15. The system of claim 11, wherein the fault configuration data includes at least one selected from a group consisting of:
- an identifier of a fault,
- a location of the fault in the SDK,
- an indicator indicating whether to generate the fault, and
- one or more parameters associated with the fault.

16. The system of claim 12, the computer-executable instructions when executed further causing the system to:
- generate, by the fault-enabled SDK based on a status of the fault test switch, the fault according to the fault configuration data; and
- provide the fault in response to the received API call from the client application.

17. A computer-readable non-transitory recording medium storing computer-executable instructions that when executed by a processor cause a computer system to:
- determine, based on a retrieved fault event log and a predetermined threshold of a frequency of fault occurrence, a fault to inject in an SDK;
- automatically inject the fault in the SDK to generate a fault-enabled SDK to test a client application;
- generate a fault configuration data; and
- output the fault-enabled SDK and the fault configuration data.

18. The computer-readable non-transitory recording medium of claim 17, the computer-executable instructions when executed further causing the computer system to:
- rank, based on the frequency of fault occurrence, faults in the fault event log; and
- determine the fault to inject in the SDK, wherein the fault is the highest ranked fault in the ranked faults in the fault event log.

19. The computer-readable non-transitory recording medium of claim 17, wherein the SDK includes:
- an application programming interface (API), and
- a transport layer,
- wherein the API interfaces a client application,
- wherein the transport layer transmits a request for processing data to a remote server using a Representative State Transfer (REST) API,
- and wherein the transport layer includes the automatically injected fault as a status of the request using the REST API.

20. The computer-readable non-transitory recording medium of claim 19, wherein the fault-enabled SDK includes a fault test switch, and the method further comprising:
- receiving an API call from the client application; and
- generating, based on the fault test switch, the fault associated with the received API call to test the client application.

* * * * *